(12) United States Patent
Livesay et al.

(10) Patent No.: US 12,061,133 B2
(45) Date of Patent: Aug. 13, 2024

(54) METHODS AND APPARATUS FOR MEASURING IMPACT OF SOLAR IRRADIANCE ON HYDROSTATIC PRESSURE TESTING

(71) Applicant: Hecate Software, Inc., Richland, WA (US)

(72) Inventors: Eric A. Livesay, Richland, WA (US); Ronald B. Livesay, Richland, WA (US)

(73) Assignee: HECATE SOFTWARE INC., Richland, WA (US)

( * ) Notice: Subject to any disclaimer, the term of this patent is extended or adjusted under 35 U.S.C. 154(b) by 437 days.

(21) Appl. No.: 17/170,515

(22) Filed: Feb. 8, 2021

(65) Prior Publication Data
US 2021/0247262 A1    Aug. 12, 2021

Related U.S. Application Data

(60) Provisional application No. 62/971,863, filed on Feb. 7, 2020.

(51) Int. Cl.
*G01M 3/26* (2006.01)
*G01L 13/00* (2006.01)
(Continued)

(52) U.S. Cl.
CPC .............. *G01M 3/26* (2013.01); *G01L 13/00* (2013.01); *G01L 19/0092* (2013.01); *G01L 19/0672* (2013.01)

(58) Field of Classification Search
CPC ...... G01M 3/26; G01L 13/00; G01L 19/0092; G01L 19/0672
See application file for complete search history.

(56) References Cited

U.S. PATENT DOCUMENTS 4,383,436 A     5/1983   Hailey
5,069,062 A  *  12/1991  Malecek ............... G01L 27/007
                                                         73/49.7
(Continued)

FOREIGN PATENT DOCUMENTS

| CN | 105373857 | * | 3/2016 |
| WO | 2008085442 A1 | | 7/2008 |
| WO | 2009026357 A2 | | 2/2009 |

OTHER PUBLICATIONS

U.S. Department of Commerce—National Oceanic and Atmospheric Administration (NOAA), 2023.*

(Continued)

*Primary Examiner* — Mohamed Charioui
*Assistant Examiner* — Lynda Dinh
(74) *Attorney, Agent, or Firm* — Pillsbury Winthrop Shaw Pittman LLP

(57) ABSTRACT

Provided is a hydrostatic pressure testing system that can account to solar irradiance, comprising a controller configured to control the hydrostatic pressure testing system during hydrostatic pressure testing on an installation, a test fluid assembly configured to transfer a test fluid to the installation, a plurality of pumps configured to pressurize the installation to a first pressure level using the test fluid, a plurality of pressure sensors configured to measure pressure of the test fluid in the installation, and a plurality of irradiance sensors configured to measure solar irradiance on the installation.

19 Claims, 6 Drawing Sheets

(51) Int. Cl.
    *G01L 19/00*         (2006.01)
    *G01L 19/06*         (2006.01)

(56) References Cited

U.S. PATENT DOCUMENTS

| | | | |
|---|---|---|---|
| 6,227,035 | B1 | 5/2001 | Rice et al. |
| 7,401,654 | B2 | 7/2008 | Franklin |
| 7,706,980 | B2 | 4/2010 | Winters et al. |
| 8,082,995 | B2 | 12/2011 | Symington et al. |
| 8,380,448 | B2 | 2/2013 | Franklin |
| 8,986,607 | B2 * | 3/2015 | Anderle ............... A61L 2/0017 422/24 |
| 9,207,143 | B2 | 12/2015 | Franklin et al. |
| 9,377,216 | B2 * | 6/2016 | Klier .................... F24S 10/753 |
| 9,664,585 | B2 * | 5/2017 | Stering ................. G01L 27/005 |
| 2006/0032550 | A1 | 2/2006 | Wodjenski |
| 2008/0185143 | A1 | 8/2008 | Winters |
| 2011/0046903 | A1 | 2/2011 | Franklin |
| 2011/0178736 | A1 * | 7/2011 | Westra ...................... F17D 5/02 702/50 |
| 2014/0278107 | A1 * | 9/2014 | Kerrigan ................ G01W 1/18 702/3 |
| 2016/0230505 | A1 * | 8/2016 | Garcia .................... E21B 34/10 |
| 2019/0004211 | A1 * | 1/2019 | Kakimoto ............... G01W 1/12 |
| 2020/0285691 | A1 * | 9/2020 | Hoff ........................ G06F 17/18 |

OTHER PUBLICATIONS

National Geographic Atmospheric Pressure (NGAP), 2023.*
Amajama, Effect of Air Pressure on the output of Photovoltaic Panel and Solar Illuminance (or Intensity), 2016.*

* cited by examiner

METHODS AND APPARATUS FOR MEASURING IMPACT OF SOLAR IRRADIANCE ON HYDROSTATIC PRESSURE TESTING

CROSS-REFERENCE TO RELATED APPLICATIONS

This patent claims the benefit of U.S. Provisional Patent Application 62/971,863, filed 7 Feb. 2020, titled METHODS AND APPARATUS FOR MEASURING IMPACT OF SOLAR IRRADIANCE ON HYDROSTATIC PRESSURE TESTING. The entire content of this application is hereby incorporated by reference for all purposes.

BACKGROUND

1. Field

The present disclosure relates generally to hydrostatic pressure testing, and more specifically accounting for the impact of solar irradiance on pressure testing.

2. Description of the Related Art

In the oil and gas industry, pressurized components are ubiquitous. It is necessary to periodically test these systems in order to insure they will not leak when subjected to the pressures that may be encountered during operations.

Over the years, there have been a number of methods utilized to detect possible leakage in the pressurized systems. It is especially important that the joints between sequential pipe sections be tested. Mechanical deformation of the containment cavity or thermal flux related to the contained fluid will cause pressure changes in the trapped fluid. Detecting leaks in components, or leak rates in components, can be performed through pressure tests, in which a pressurizable component or subset of components of a pressure system (e.g., a blowout preventer) is pressurized by adding test fluid under pressure and capturing the pressurized fluid within a pressurizable volume. Pressure is measured over time and the changes in pressure are used as indicative of potential leaks. Of particular interest here is the effect of solar radiation on the fluid in the trapped cavities of the pressurized system. Equipment used in hydrocarbon extraction can often be exposed to intense sun immediately prior to its use. Solar radiation can be related to the heat within the system, and heat has a known relationship with pressure. Solar irradiation can increase the pressure within a pressurized system, providing data that can be mistaken or disguise leak-related pressure changes. At times, a system with an unacceptable leak rate may have that leak rate disguised by a sudden increase in irradiance. In that scenario, while pressure would be falling because of a leak, the observed pressure remains artificially high because of the irradiance, causing a test result that is not indicative of the true leak rate. This behavior can be viewed as contrary to expected behavior: as fluid leaks from the pressure system, the pressure inside will drop. A graph of this pressure on a time-pressure graph with the pressure on the ordinate axis would have a downward trend over time. But observed results often differ from this expected behavior and for a period of time, pressure will increase (or be artificially high) before decreasing as expected. Because of this behavior, time is wasted while the artificial increase in pressure subsides and the solar radiation has no effect.

As a consequence, there is a need for measuring pressure behavior that accounts for solar irradiance such that the data from the period of time prior to dissipation of solar radiation. There is further a need to account for solar irradiance in a manner that is easily understandable, reliable, verifiable scientifically, and acceptable to regulatory entities that validate equipment used for hydrocarbon extraction.

SUMMARY

The following is a non-exhaustive listing of some aspects of the present techniques. These and other aspects are described in the following disclosure.

Some aspects include a hydrostatic pressure testing system, comprising a controller configured to control the hydrostatic pressure testing system during hydrostatic pressure testing on an installation, a test fluid assembly configured to transfer a test fluid to the installation, a plurality of pumps configured to pressurize the installation to a first pressure level using the test fluid, a plurality of pressure sensors configured to measure pressure of the test fluid in the installation, and a plurality of irradiance sensors configured to measure solar irradiance on the installation.

In some aspects, an array of solar irradiance sensors such as pyranometers are distributed about the equipment exposed to solar radiation, and the signal from those sensors are utilized to calculate the pressure related behavior attributable to solar irradiation.

Other aspects include incorporating into the hydrostatic pressure testing system described above, wherein the controller is further configured to effectuate the determining operation by determining variations of the pressure over time caused by the solar irradiance in real time. Other aspects include a plurality of temperature sensors configured to measure temperature of the test fluid. Even further variants include the hydrostatic pressure testing system described above wherein the controller is configured to, with one or more processors, effectuate operations comprising obtaining a regression model, wherein the regression model comprises one or more undetermined coefficients; determining the one or more undetermined coefficients using the measured pressure and the measured solar irradiance over time; and predicting the pressure of the test fluid in the installation using the regression model.

Aspects include utilizing the hydrostatic pressure testing system described above with the test fluid as a non-compressible fluid. Other aspects include the hydrostatic pressure testing system, wherein at least portions of the installation are exposed to solar irradiance. In conjunction with this aspect, also included is the hydrostatic pressure testing system, wherein a plurality of irradiance sensors are located on the portions of the installation that are exposed to solar irradiance.

Other aspects include the hydrostatic pressure testing system described, wherein at least some of plurality of irradiance sensors are variants of an actinometer. In other variants, the hydrostatic pressure testing system is as described, wherein at least some of plurality of irradiance sensors are pyranometers or pyrheliometer.

The hydrostatic pressure testing system described can include steps for predicting the pressure of the test fluid in the installation after the installation is pressurized to a first pressure level. It can also include steps for determining effect of solar irradiance on the pressure of the test fluid. The system can include steps for developing a solar irradiance estimation model with the estimated global horizontal irradiance on the installation during the hydrostatic pressure testing.

In some aspects, the hydrostatic pressure testing system has a first pressure level is in the range of 5,000 psi and 15,000 psi. In certain other aspects, the first pressure level is lower, such as 100 psi to 500 psi, and the second pressure level is higher, such as 5,000 psi to 15,000 psi.

In other aspects, the controller is configured to, with one or more processors, effectuate operations comprising: obtaining a sinusoidal model, wherein the sinusoidal model comprises one or more undetermined coefficients; and determining the one or more undetermined coefficients using the measured pressure and the measured solar irradiance over time.

Under some aspects, the controller is configured to, with one or more processors, effectuate operations comprising: obtaining a measured pressure from the plurality of pressure sensors every 1 second; obtaining a measured solar irradiance from the plurality of pressure sensors every 1 second; and storing the measured pressure and the measured solar irradiance over time in a memory. In some aspects, other times are used, either greater or less than one second, depending on the needs of the system, the capabilities of the measurement equipment, data storage needs, and otherwise.

Also included is a method for effectuating a system or a similar system. Included is a method of hydrostatic pressure testing comprising the steps of: providing a hydrostatic pressure testing system comprising: a controller configured to control the hydrostatic pressure testing system during hydrostatic pressure testing on an installation; a test fluid assembly configured to transfer a test fluid to the installation; a plurality of pumps configured to pressurize the installation to a first pressure level using the test fluid; a plurality of pressure sensors configured to measure pressure of the test fluid in the installation; and a plurality of irradiance sensors configured to measure solar irradiance on the installation, wherein: the controller is configured to, with one or more processors, effectuate operations comprising: monitoring the pressure of the test fluid as a function of time; and determining variations of the pressure over time, after the installation is pressurized to a first pressure level, caused by the solar irradiance.

Certain aspects include calculations in which the variations of the pressure over time caused by the solar irradiance are determined in real time.

Other variants include the hydrostatic pressure testing method described above comprising: a plurality of temperature sensors configured to measure temperature of the test fluid.

In other aspects, the controller is configured to, with one or more processors, effectuate operations comprising: obtaining a regression model, wherein the regression model comprises one or more undetermined coefficients; determining the one or more undetermined coefficients using the measured pressure and the measured solar irradiance over time; and predicting the pressure of the test fluid in the installation using the regression model. In other variants, the controller is configured to, with one or more processors, effectuate operations comprising: obtaining a sinusoidal model, wherein the sinusoidal model comprises one or more undetermined coefficients; and determining the one or more undetermined coefficients using the measured pressure and the measured solar irradiance over time.

Some aspects include a computer-implemented method for calculating the effect of solar irradiance during hydrostatic pressure testing.

Some aspects include a modified formula to calculate the effect of solar irradiation on the pressure behavior of a pipeline system.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
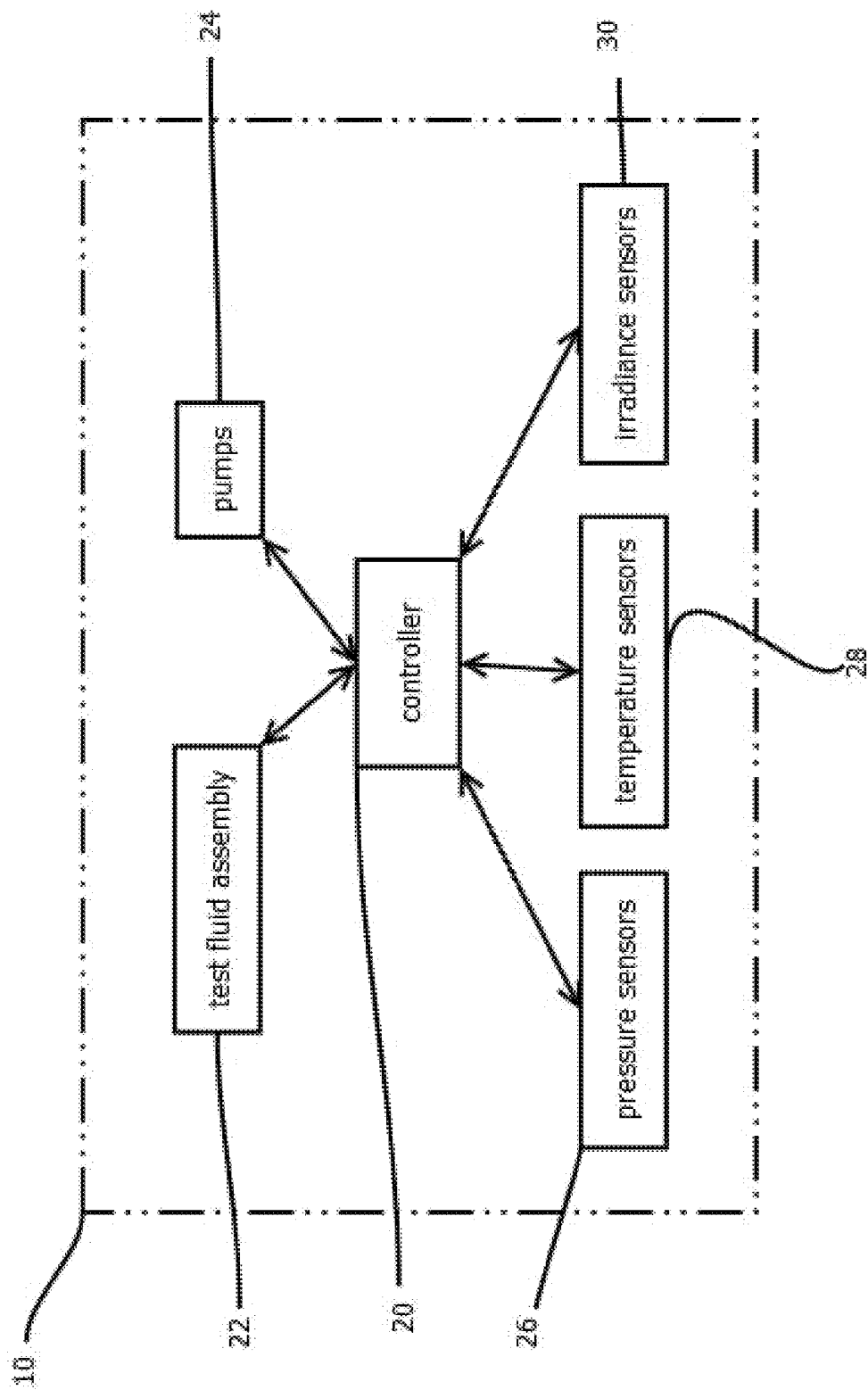
FIG. 1 is a block logical and physical architecture diagram showing an embodiment of a hydrostatic pressure testing in accordance with some of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of fluid mechanics. Indeed, the inventors wish to emphasize the difficulty of correlating solar radiation to trapped-fluid pressure behavior. Solar radiation has long been understood to have an effect, sometimes a significant effect, on pressure testing results. Further, because multiple problems are addressed, it should be understood that some embodiments are problem-specific, and not all embodiments address every problem with traditional systems described herein or provide every benefit described herein. That said, improvements that solve various permutations of these problems are described below.

The included techniques can be utilized as a part of pressure testing of a pressurizable vessel or system, including use in the oil production field with blowout preventers and related equipment. In these techniques a series of tests can be performed utilizing the pressurizable system, equipped with pressure sensors and appropriate sensors for determining solar irradiation, such sensors configured to transform the measured values for pressure and irradiance into a signal representative of the measured value, to be transmitted to a computer system equipped with a processor and an output device. Such techniques can be used in subsea or surface operations, and can be used in conjunction with offshore platforms, surface rigs, drilling lines, production lines, and otherwise. The included techniques can be utilized in conjunction with verification testing of pressure systems, such as those described as of the date of this patent filing in 30 CFR 250.737 ("What are the BOP system testing requirements?") and other regulatory requirements and safety protocols designed to determine integrity of pressure systems. The techniques taught herein can be utilized independently of any other testing as a stand-alone determinant of existing leak rates or as the establishment of a baseline behavior for future observations, or the techniques can be utilized in conjunction with low-pressure and high-pressure testing for validation purposes.

Some examples below relate generally to methods for calculating the effect of solar irradiation on hydrostatic pressure testing. These methods may provide better understanding of the pressure behaviors and allow more accurate models to predict the pressure behavior.

In some embodiments, a hydrostatic pressure testing system is provided to effectively analyze the pressure decay in real time. In some embodiments, the effect of solar radiation is calculated on the pressure decay.

In some embodiments, the effects of solar irradiation on the pressure behavior of pressurized systems are calculated to provide a more accurate understanding of possible leakage in the system.

In some embodiments, a plurality of pyranometers, located at different parts of the system, are employed to measure an average solar irradiation applied on the system.

In some embodiments, a hydrostatic pressure testing method is provided to finding leaks and flaws in vessels and pipelines. In some embodiments, a hydrostatic pressure testing method is provided to determine whether a particular installation is suitable and safe for use with working under a particular pressure. Examples of installations that the hydrostatic pressure testing may be performed include offshore drilling rigs to test the integrity of the choke manifold, rams and annulars of the blowout preventer (BOP).

In some embodiments, FIG. 1 is a block logical and physical architecture diagram showing an embodiment of hydrostatic pressure testing system 10 that may include a controller 20, a test fluid assembly 22, a series of pumps 24, a series of pressure sensors 26, a series of temperature sensors 28, and a series of irradiance sensors 30.

In some embodiments, the test fluid 22 may be stored in a tank and a pump may be used to transfer the test fluid from the test fluid tank through the installation. In some embodiments, the test fluid is water as the non-compressible testing medium. In some embodiments, the test fluid may be recycled to be used again to minimize the cost and the waste after each run.

In some embodiments, a hydrostatic pressure testing system may include a series of pumps 24 capable of increasing the fluid pressure (e.g. 200, 500, 1000, 5000, 10000, 20000, or 30000 psi) within an internal section of the installation during hydrostatic pressure testing operations.

In some embodiments, a hydrostatic pressure testing system may include a series of pressure sensors 26 to measure the fluid pressure at different points of the installation during hydrostatic pressure testing operations. In some embodiments, a controller may store the detected fluid pressure measured at different time intervals during the hydrostatic pressure testing. The series of pressure sensors may be programmed and instructed by the controller to measure the pressure every 0.1, 1, 5, 30, 60, 300, or 600 seconds. It should be understood that measurements taken at other periods and other intervals, or irregularly, are within the scope of this disclosure. Measurements, transmission of data, and analysis of the same can vary based on the needs of the system, the quality of the information sought, the signal capabilities, data storage capabilities, signal analysis capabilities, and otherwise. In some embodiments, each sensor from the series of pressure sensors may have a different instruction for measuring the pressure; such instructions may include a starting time, a duration, and a time interval between each measurement.

In some embodiments, a hydrostatic pressure testing is applied on an installation with working pressure of about 500 to about 20000 psi, about 5000 to about 15000 psi, about 10000 to about 30000 psi, about 10000 to about 20000 psi, about 5000 to about 30000 psi, or about 500 to about 15000 psi.

In some embodiments, a hydrostatic pressure testing is applied for a specific time depending on the requirements of the installation, and the regulatory regime that applies in the locale where the installation is being constructed. In some embodiments, a hydrostatic pressure testing will be held for at least 1, 4, 12, 24, 36, or 48 hours. In some embodiments, a hydrostatic pressure testing will be held at the maximum operating pressure for at least four hours.

In some embodiments, the measured pressure, during a hydrostatic pressure testing, reaches a maximum at the end of the pumping process. Thereafter, in some embodiments, the measured pressure shows a decay as a function of time. In some embodiments, the prolonged decay of pressure with time may be attributed to the heating of the test fluids during pressurization followed by cooling of the test fluids after the pumping stops. The real time analysis of the pressure decay may save time and money during the hydrostatic pressure testing.

In some embodiments, a hydrostatic pressure testing system is provided to effectively analyze the pressure decay in real time or in substantially real time. In cases of real time measurement or substantially real time measurement, analysis is provided at a lag behind a given pressure at a small value accounting for measurement, storage, signal transfer, signal processing, calculations, and validations, typically in delays of less than 10 seconds from the occurrence of a given pressure. In some embodiments, the effect of solar radiation is calculated on the pressure decay.

In some embodiments, a hydrostatic pressure testing is ended when pressure decline rates, during the testing, reach a certain number. Testing can be considered stable at this time For example, the hydrostatic pressure testing may be stopped or the test stabilized when the decline rate reaches −10, −5, −4, −3, or −2 psi/min. In some embodiments, a hydrostatic pressure testing is ended when a minimum of 10, 20, 50, 60, 100, or 200 consecutive pressure measurements are within 3 psi of one another. In some embodiments, a hydrostatic pressure testing is ended when a minimum of 10, 20, 50, 60, 100, or 200 consecutive pressure measurements are within 5 psi of one another. In some embodiments, a hydrostatic pressure testing is ended when consecutive pressure measurements are within 3 psi of one another for at least 2, 5, 10, 20, or 30 minutes. In some embodiments, a hydrostatic pressure testing is ended when consecutive pressure measurements are within 5 psi of one another for at least 2, 5, 10, 20, or 30 minutes. It should be understood that other thresholds of consecutive pressure measurements for stability can be utilized, and other periods of time can be required, for instance, based on regulatory requirements.

In some embodiments, a hydrostatic pressure testing system may include a series of temperature sensors 28 to measure temperature in the internal section of the installation and an external temperature surrounding an outer surface of the installation during hydrostatic pressure testing operations. In some embodiments, a controller may store the detected fluid temperature and the external temperature measured at different time intervals during the hydrostatic pressure testing. The series of temperature sensors may be programmed and instructed by the controller to measure the temperature every 0.1, 0.5, 1, 5, 30, 60, 300, or 600 seconds. In some embodiments, each sensor from the series of temperate sensors may have a different instruction for measuring the temperature; such instructions may include a starting time, a duration, and a time interval between each measurement.

In some embodiments, a hydrostatic pressure testing system may include a series of irradiance sensors 30 (e.g. variants of an actinometer such as a pyrheliometer or a pyranometer) to measure solar irradiance. The irradiance sensors may be positioned on the portions of the installation that are exposed to solar irradiance. Measuring the solar radiance, using a pyranometer, allows the hydrostatic pressure testing system to evaluate the impact of sun, smog, haze, or clouds on the measured pressure and the decay profile.

Solar irradiance is composed of direct, diffuse, and ground reflected irradiance using an actinometer variant. In some embodiments, a pyranometer may be used to measure broadband irradiance and can measure global horizontal irradiance. The pyranometer is also capable of measuring diffuse horizontal irradiance when outfitted with a shadow band and sun tracking equipment to obscure direct radiation. In some embodiments, a pyrheliometer, is calibrated for direct irradiance and tracks the sun in order to measure direct normal irradiance.

In some embodiments, a hydrostatic pressure testing system may isolate a portion of the installation and measure the pressure within the isolated portion. A predetermined regression model may be employed to monitor pressure as a function of time in the isolated portion.

In some embodiments, a hydrostatic pressure testing system may measure the pressure in real time and a predetermined regression model may be employed to fit the measure pressure over time.

In some embodiments, a hydrostatic pressure testing system may measure the temperature in real time and a predetermined regression model may be employed to fit the measure pressure over time while taking into account the effect of temperature variation on pressure.

In some embodiments, a hydrostatic pressure testing system may measure the solar irradiance in real time and a predetermined regression model may be employed to fit the measure pressure over time while taking into account the effect of solar radiation on pressure.

In some embodiments related to measurements in the absence of solar radiation, measured pressure versus time, at each isolated portion, may be fit by a function in the form of:

$$P(t) = A + \frac{b}{c + t^m} \quad \text{Eq. 1}$$

in a regression to minimize the difference (e.g. in a least-squares sense) between the measured pressure and a predicted pressure value by Eq. (1) at the same times. The values of A, b, c, and m that provide the best fit of the function to the data are then calculated. Empirical testing has determined that the above Equation 1 is useful over a wide range of applications. In some embodiments, the values of the variables shown in Eq. 1 and elsewhere are regressed over a series of measurements at or around stabilization, that is, after a series of measurements results in regressed variable values that do not vary significantly upon the receipt and incorporation of additional measurements. In some embodiments, one or more of the variables may be pre-set or estimated. Estimates can be based on historical observations, knowledge of use of specific materials or configurations, or otherwise. Pressure can be determined as a function of time by different equations, including different exponential decay equations, parabolic equations, hyperbolic equations, and other higher order equations. Pressure can be determined as a function of time by other partial differential equations, including equations with known boundary conditions, including conditions determined based on immediately prior measurements, or recent measurements, or using mathematical techniques to combine the two (e.g., averages, medians, running averages, smoothing techniques, and otherwise).

In some embodiments, compensation due to irradiation may be accounted for through various accounting techniques. In one technique related to measurements in the presence of solar radiation, measured pressure versus time, at each isolated portion, may be fit by a function in the form of:

$$P(t) = \left(A + \frac{b}{c + t^m}\right) + f(I(t)) \quad \text{Eq. 2}$$

in a regression to minimize the difference (e.g. in a least-squares sense) between the measured pressure and a predicted pressure value by Eq. (2) at the same times. The values of constants A, b, c, and m that provide the best fit of the function to the data are then calculated. f(I(t)) is the pressure behavior due to the irradiance I, from the sun effective on the tested system. Other techniques can be utilized to account for irradiance paired with a pressure decay equation, such as estimates based on observation, techniques utilizing empirical data derived from geographic position, components used, weather conditions, physical orientation, and otherwise.

Figure 3:
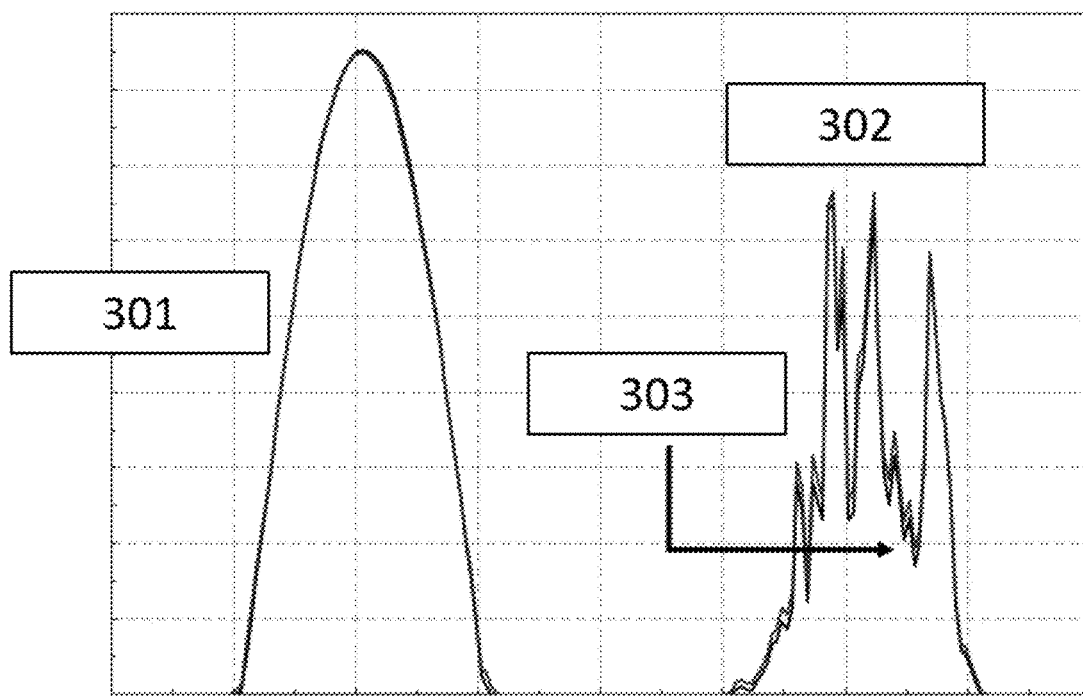
FIG. 3 is a chart showing irradiance on an exemplary clear day and an exemplary cloudy day.

In certain techniques, f(I(t)) is determined through direct measurement, or though measurement best fit into an equation. One or a plurality of irradiance sensors, such as pyranometers, pyrheliometers, net radiometers, are arranged to receive information related to solar radiation relevant to components likely or known to be exposed to solar radiation in amounts suspected to be sufficient to affect pressure. The pyranometers or other such meters can be arranged to be in communication with a computer system such that in this manner, the pyranometers can measure and transmit a signal representative of the solar irradiation on the exposed components. In FIG. 3, two curves are shown displaying irradiance on a clear day 301 and irradiance on an exemplary cloudy day 302 as measured by different two irradiance sensors, such as a pyranometer, creating virtually overlapping charts. The irregular valleys 303 are indicative of irradience measures at times when sunlight falls because of, for example, sudden cloud cover. The overall lower peaks on the cloudy day 302 indicates that even at its sunniest, the irradiance of the exemplary cloudy day is less than the clear day. In some scenarios, the irradiance of the exposed components or a point within the component can be measured with a single irradiance sensor. In certain other scenarios, the irradiance can be measured for a component or a location in the component with a series of sensors distributed about the exposed equipment, and irradiance at any particular point can be based on a number of mathematical techniques, including utilizing the measured irradiance at the nearest sensor and weighted averaging the irradiance of a plurality of sensors. Weight can be by, for example, the distance between the sensor and the point of interest. Weight can be by, for instance, angle of incident between the location of interest and the horizon, the angle of the sun, the angle of an appropriate sensor, or otherwise. Weighting can be by, for example, geometric specifics of the components measured. For instance, the pressure change due to irradiance on a larger exposed surface can be weighted against the pressure change due to irradiance on a smaller exposed surface, such weight by exposed surface area. In such techniques, the weighting factor of these components would be constant and need not be recalculated for tests. As such, a standard table of weighting factors for particular components can be generated.

In some scenarios, the irradiance sensors can be arranged to create a grid that can overlay the equipment of interest. As such, a topographic map of irradiance can be created to understand the irradiance and at any point on the exposed equipment. In some deployments, it is clear that some of the items being pressure tested are large enough that the items could be completely exposed to sunlight, completely blocked from sunlight (e.g., by a cloud) or simultaneously partially exposed to sunlight and partially shaded from sunlight.

In scenarios where a plurality of sensors are utilized, there are a number of mathematical techniques that can be used to calculate the irradiance component of the pressure from the irradiance over the entirety of the exposed components. Some techniques include simple averaging of irradiance measured on opposite sides of a component, averaging all sensors placed along a components, and averaging weighted irradiance for components. In the latter case, the average irradiance average can be expressed as $$I_{average} = \frac{1}{n}\sum_{1}^{n} w_i + I_i$$

where there are n sensors and each sensor on equipment or component "i" has a weighting factor $w_i$ and a measured irradiance $I_i$.

Figure 4:
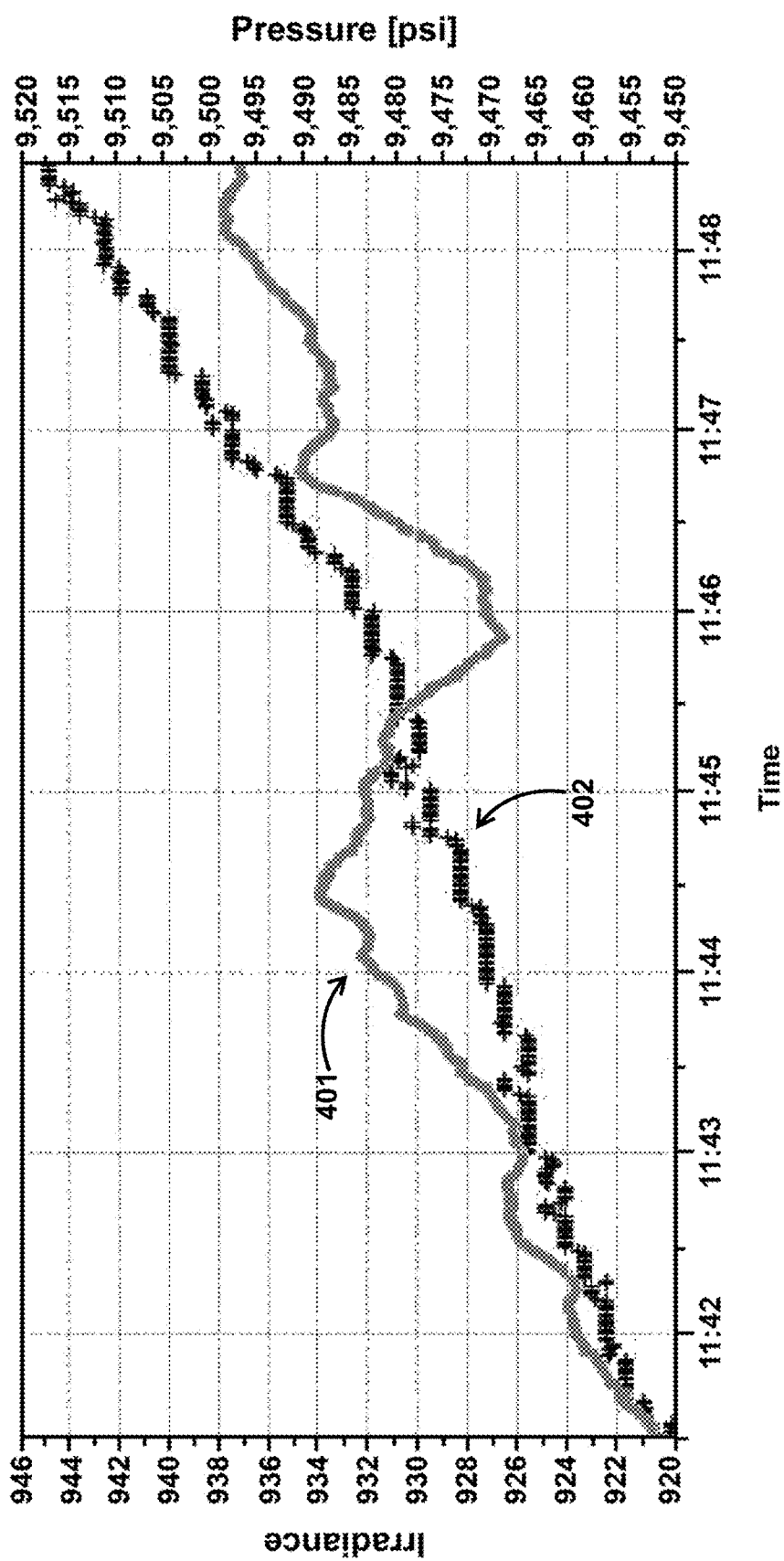
FIG. 4 is a chart showing measured irradiance and pressure versus time in a pressure system.
Figure 5:
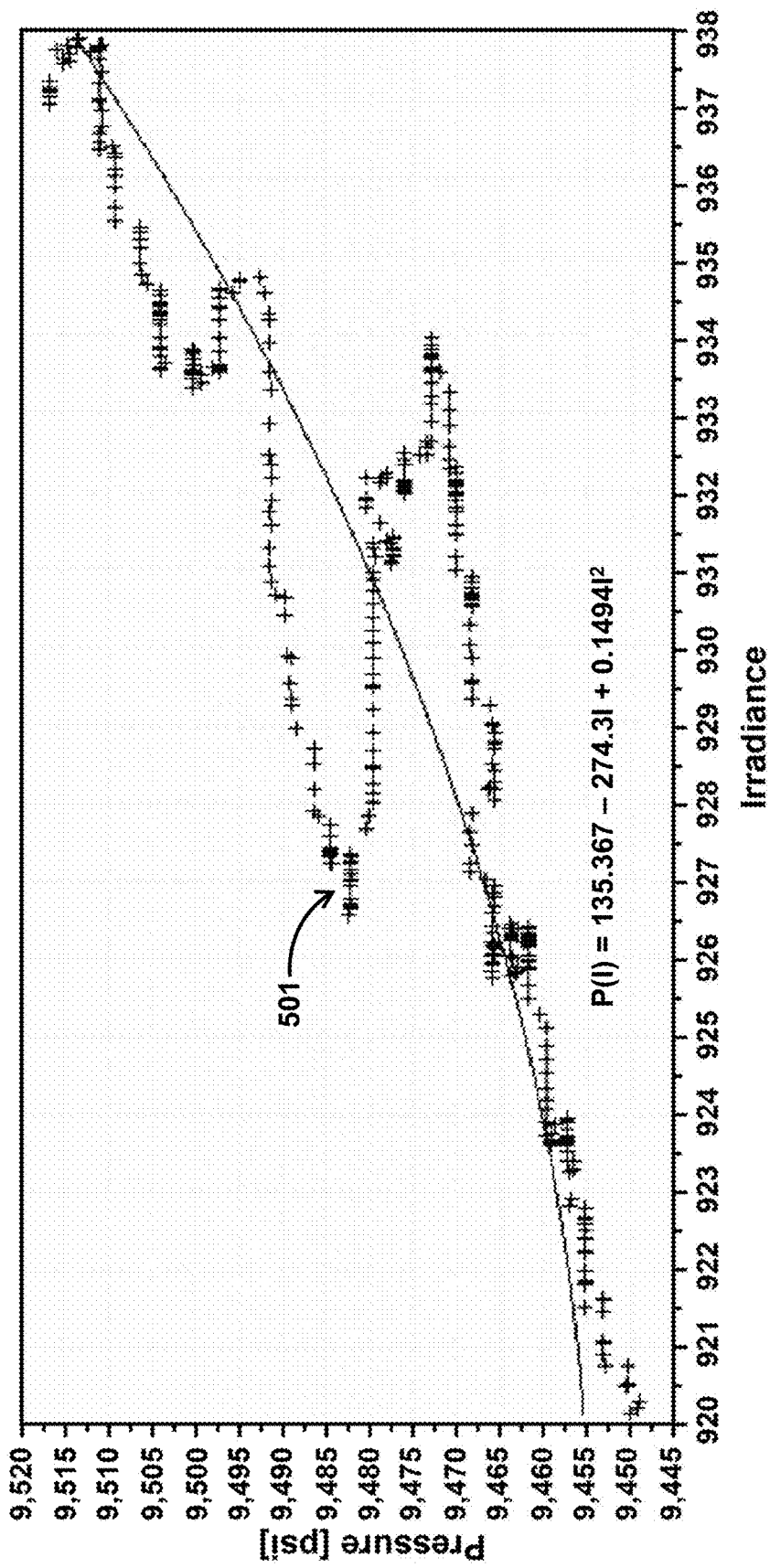
FIG. 5 is a chart showing the data of FIG. 4, wherein the pressure is charted against irradiance and a best fit is created.

Under some teachings herein, the irradiance can be correlated to an effect on pressure. FIGS. 4 and 5 show empirical correlations between irradiance, pressure, and time. FIG. 4 represents the pressure over time of a shut in system where no additional pressure from pump was added after the initial pressure up. The system was exposed to the sun and the pressure rises. Irradiance was measured the location and charted 401. Despite no pumping, pressure 402 was seen the climb. The same data was graphed in FIG. 5, charting pressure against irradiance shown on data points 501 Using best fit techniques, a polynomial of 135.367−274.31+0.1494I² was generated, which could be used as f(I(t)) in the above equation. In this regard, exemplary polynomial for the relationship between irradiance and the component of the pressure attributable to irradiance was determined. There are many different relationships between irradiance and pressure that are contemplated herein, such as higher order polynomials, non-polynomial functions, and otherwise. The relationship can depend on, for instance, the period of the day over which testing is to occur, the length of time a test is to occur. Moreover, the pressure change attributable to irradiance can be seen to depend on previously absorbed irradiance and amount of time absorption has occurred.

In some embodiments, effect of solar irradiance on the pressure in an installation may be fit by a function having a constant portion and a trigonometric portion, such as a sinusoidal model. For instance, the equation can be presented in the form of:

$$f(I(t))=D+E\sin(\theta_o+t) \qquad \text{Eq. 3}$$

in a regression to minimize the difference (e.g. in a least-squares sense) between the measured pressure and a predicted pressure value by Eq. (3) at the same times.

In some embodiments, the values of constants D, E, and $\theta_o$ that provide the best fit of the function to the data may be then calculated by making a finite number of simultaneous measurements (minimum of three) of the irradiance and pressure. Because a minimum of three measurements are taken, a curve of the assumed form can be regressed. As additional measurements are made, the curve will stabilize and the variables will become more certain. This method may be applied when there is no or minimal applied external pressure and the pressure changes may be solely attributed to solar irradiance. This method provides an average or applied effect of solar irradiance on the pressure within the system and the solar irradiance may be measured before or after the hydrostatic pressure testing. In certain other situations, error factors can be incorporated into the above Equation 3 as a separate variable. In certain other situations, D can be replaced with a function that can be linear or higher order, and can account for drift in the amount to be added to the trigonometric portion (e.g., the sinusoidal model shown above) or other factors.

In some embodiments, the values of constants D, E, and $\theta_o$ that provide the best fit of the function to the data may be then calculated by making real time or substantially real time measurements of the irradiance and pressure during the hydrostatic pressure testing. This method provides the direct effect of solar irradiance on the pressure in real time and the solar irradiance may be measured only during the hydrostatic pressure testing.

In some embodiments, only a single irradiance sensor 30 is used to measure the effect of solar irradiance on the pressure in an installation.

In some embodiments, a series of irradiance sensors 30 may be used to measure the effect of solar irradiance on the pressure in an installation. The series of irradiance sensors 30 may be located at different parts and portions of the installation under hydrostatic pressure testing. An overall effect of solar irradiance on the pressure may be calculated using Eq. (4):

$$f(I(t)) = \sum_{i=1}^{N} f_i(I_i(t)) \qquad \text{Eq. 4}$$

Wherein $I_i(t)$ is the irradiance from irradiance sensor "i" and N is the number of irradiance sensors 30.

In some embodiments, a weight factor may be assigned to each irradiance sensor from the series of irradiance sensors 30. A weight factor of a irradiance sensor located at point "X" may be calculated based on the effect of solar irradiance on pressure at point "X" compared to the effect of solar irradiance on pressure at the other points where the other sensors are located. The weight factor can be calculated or estimated based on a number of techniques, including historical observations, numerical techniques, or knowledge of the materials and orientation of the system in consideration of the conditions of the surrounding environment.

In each of the above equations, the variables, pressures and irradiance functions can be derived through a variety of mathematical techniques that account for changes in observed measurements over time, including curve fitting, running averages, or excluding measurements that vary beyond a particular user-defined threshold and otherwise. In each of the above techniques, the disclosed equations can be utilized alone to determine the functions and variables as disclosed or as a portion of a larger equation or set of calculations to determine the behavior of the system including other factors.

In some embodiments, the hydrostatic pressure testing system 10 may be configured to execute the process 100 described below with reference to FIG. 2. In some embodiments, different subsets of this process 100 may be executed by the illustrated components of the hydrostatic pressure testing system 10, so those features are described herein concurrently. It should be emphasized, though, that embodiments of the process 100 are not limited to implementations with the architecture of FIG. 1, and that the architecture of FIG. 1 may execute processes different from that described with reference to FIG. 2, none of which is to suggest that any other description herein is limiting.

Figure 2:
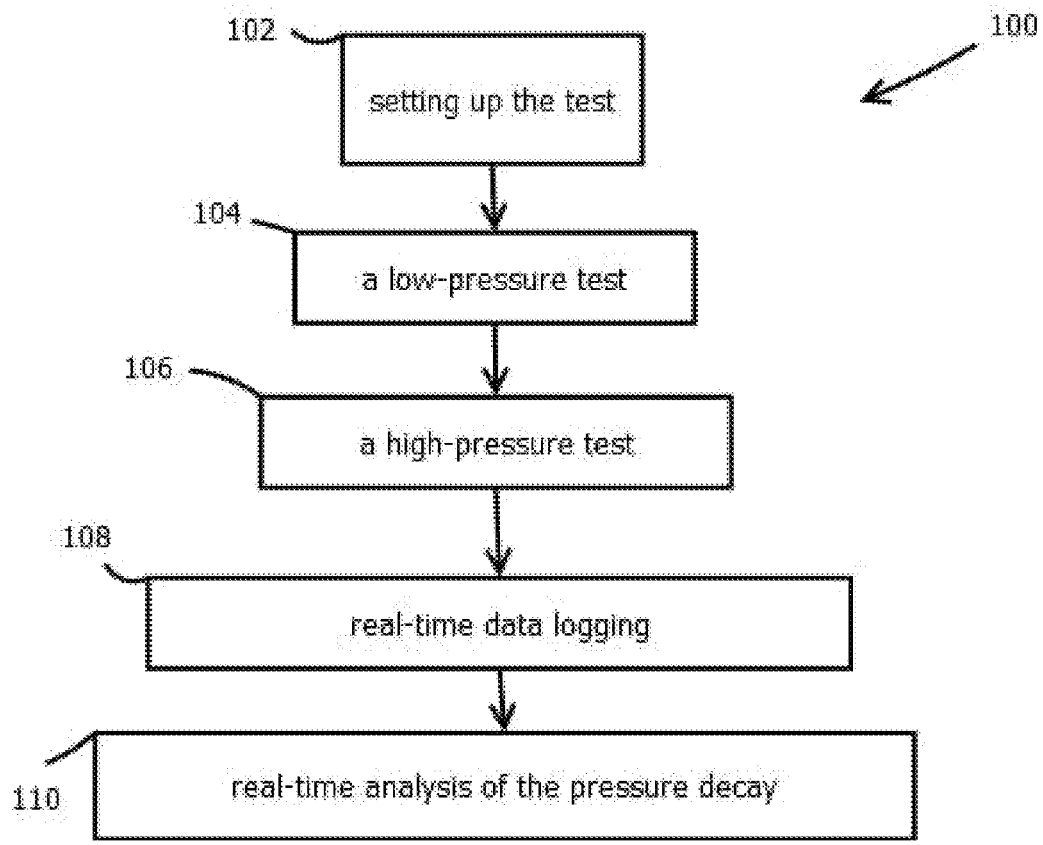
FIG. 2 is a flowchart showing an example of a process by which a hydrostatic pressure testing may be performed in accordance with some of the present techniques.

In some embodiments, the process 100 includes setting up the test as indicated by block 102 in FIG. 2. This may include deploying variable displacement of the hydrostatic pressure testing system and creating a closed cavity that is in fluidic connection to a pressure source. This closed cavity will be the portion of the installation that the hydrostatic pressure testing will be performed.

In some embodiments, the process 100 includes a low-pressure test as indicated by block 104 in FIG. 2. The low-pressure test may be performed to check the closed cavity is properly sealed before applying the higher pressure. This step may include pressurizing that closed cavity to a low-pressure (e.g. between 250 and 350 psi) and monitoring the pressure as a function of time while looking for evidence of leaks. If no leaks are found, the low-pressure test is successfully passed.

In some embodiments, the process 100 includes a high-pressure test as indicated by block 106 in FIG. 2. This step may include pressurizing that closed cavity to a high-pressure (e.g. >5,000 psi) and monitoring the pressure as a function of time while looking for evidence of leaks. In some deployments, both low pressure tests and high pressure tests can be performed, sequentially with the low pressure test preceding the high pressure test. Tests can be performed in series, including low pressure tests followed by high pressure tests. In certain deployments, the tests are performed to test various components of pressure systems, such as valves, fittings, conduits, and preventers of a blow out prevention system, including sequential tests of the various components to ensure leak detection or pressure loss qualification under regulatory schemes.

In some embodiments, as indicated by block 108 in FIG. 2, the process 100 may include real time or substantially real time data logging of various operational parameters such as temperature, pressure, and solar irradiance as a function of time. In some embodiments, the process 100 may include real time analysis of the pressure decay in the closed cavity, as indicated by block 110 in FIG. 2. If no leaks are found or if the pressure drop is satisfactorily small (e.g., below a regulatory requirement at a particular time), the closed cavity will be depressurized and the test is done. The test can be stand-alone or repeated for different components or orientations of a pressure system for validation of pressurizable sections.

In some embodiments, the pressure analysis can be coupled with a dynamic reconfiguration of pressure systems to apply different pressures to multiple different components within a pressure system (e.g., a blow out preventer). In these embodiments, a pressure system can be comprised of a variety of different components, including valves, shear ram preventers, shear ram shafts, lower blade shear rams, upper blade shear rams, pipe ram preventers, housing, pipe ram shafts, packers, wellbore, upper flanges, lower flanges, rams, tool joints, kill lines, choke lines, standpipes, kelly cocks, mud drilling valves, pump lines, relief lines, manual valves, automatic valves, and otherwise. In some embodiments, a testing protocol consisting of one or more tests of one or more component can be utilized with the described irradiance compensation equations. Some testing protocols usable with these techniques include "inside out" techniques, in which the components closest to the borehole are tested first, and those further from the borehole are tested last, such as by pressurizing the system, closing all valves, and determining whether the are leaks in the innermost portion of the system. Then, the innermost valves can be opened, and valves further outside can be opened, and so on, until all necessary components are validated or an unacceptable leak is detected. Other techniques include an "outside in" technique, in which the outer valves are closed after pressurizing, and a determination of a leak is made. Upon satisfactory finding of an acceptable leak rate, the next most outer valve is closed, the outermost valves are opened, and pressure is checked and acceptable leak rate is measured or a failed test is determined. The process is repeated until all necessary components have been tested.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the techniques included in this disclosure. Various changes may be made in the shape and arrangement of components and various functions may be used to calculate the effect of solar irradiance on the hydrostatic pressure testing.

Figure 6:
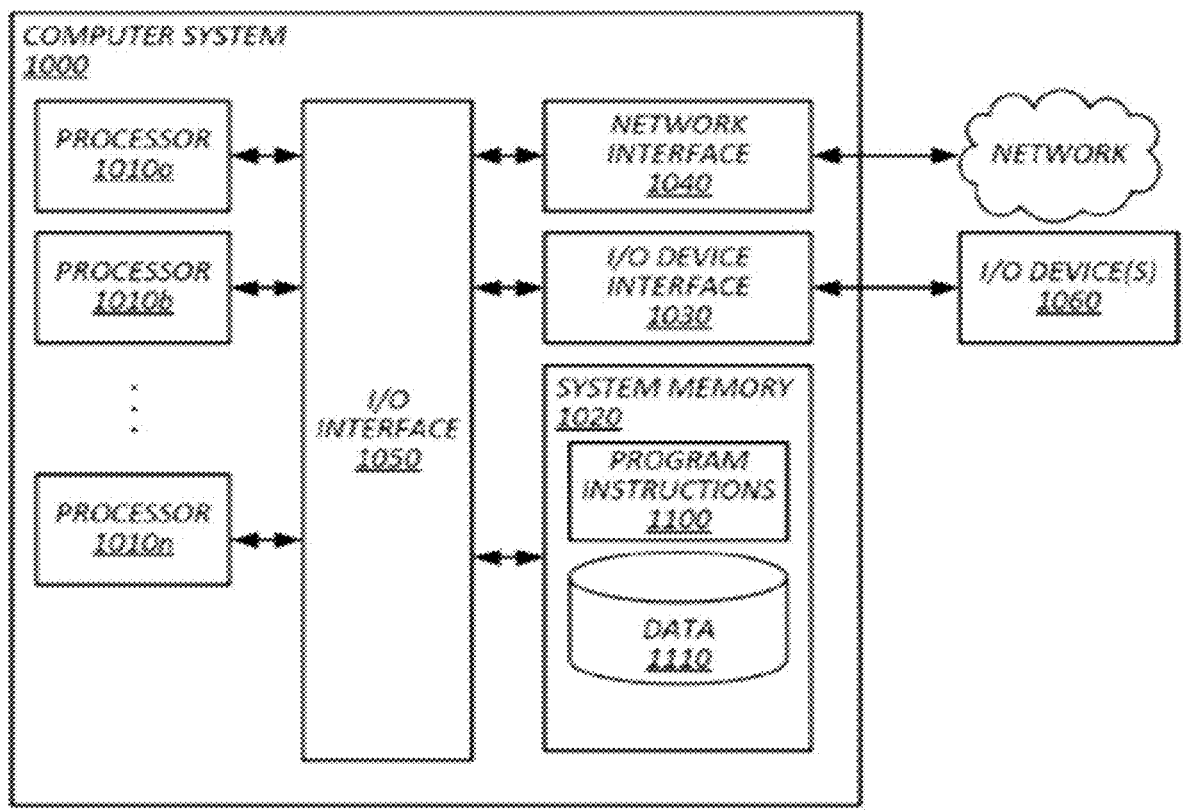
FIG. 6 illustrates an example of a computing device by which the present techniques may be implemented.

FIG. 6 is a diagram that illustrates an exemplary computing system 1000 by which embodiments of the present technique may be implemented. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehiclemounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the figures are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A hydrostatic pressure testing system, comprising:
    a controller configured to control the hydrostatic pressure testing system during hydrostatic pressure testing on an installation;
    a test fluid assembly configured to transfer a test fluid to the installation;
    a plurality of pumps configured to pressurize the installation to a first pressure level using the test fluid;
    a plurality of pressure sensors configured to measure pressure of the test fluid in the installation;
    and a plurality of irradiance sensors configured to measure solar irradiance on the installation,
    wherein the controller is configured to, with one or more processors, effectuate operations comprising:
        monitoring the pressure of the test fluid as a function of time; and
        determining variations of the pressure over time, after the installation is pressurized to a first pressure level, caused by the solar irradiance.
2. The hydrostatic pressure testing system of claim 1, wherein the controller is further configured to effectuate the determining operation by determining variations of the pressure over time caused by the solar irradiance in real time.
3. The hydrostatic pressure testing system of claim 1 further comprising: a plurality of temperature sensors configured to measure temperature of the test fluid.
4. The hydrostatic pressure testing system of claim 1, wherein the controller is configured to, with one or more processors, effectuate operations comprising: obtaining a regression model, wherein the regression model comprises one or more undetermined coefficients; determining the one or more undetermined coefficients using the measured pressure and the measured solar irradiance over time; and predicting the pressure of the test fluid in the installation using the regression model.
5. The hydrostatic pressure testing system of claim 1, wherein the test fluid is a non-compressible fluid.
6. The hydrostatic pressure testing system of claim 1, wherein at least portions of the installation are exposed to solar irradiance.
7. The hydrostatic pressure testing system of claim 6, wherein a plurality of irradiance sensors are located on the portions of the installation that are exposed to solar irradiance.
8. The hydrostatic pressure testing system of claim 1, wherein at least some of plurality of irradiance sensors are variants of an actinometer.
9. The hydrostatic pressure testing system of claim 1, wherein at least some of plurality of irradiance sensors are pyranometers or pyrheliometer.
10. The hydrostatic pressure testing system of claim 1 comprising: steps for predicting the pressure of the test fluid in the installation after the installation is pressurized to a first pressure level.
11. The hydrostatic pressure testing system of claim 1 comprising: steps for determining effect of solar irradiance on the pressure of the test fluid.
12. The hydrostatic pressure testing system of claim 1 comprising: steps for developing a solar irradiance estimation model with the estimated global horizontal irradiance on the installation during the hydrostatic pressure testing.
13. The hydrostatic pressure testing system of claim 1, wherein: the first pressure level is in the range of 5,000 psi and 15,000 psi.
14. The hydrostatic pressure testing system of claim 1, wherein the controller is configured to, with one or more processors, effectuate operations comprising: obtaining a sinusoidal model, wherein the sinusoidal model comprises one or more undetermined coefficients; and determining the one or more undetermined coefficients using the measured pressure and the measured solar irradiance over time.

15. The hydrostatic pressure testing system of claim 1, wherein the controller is configured to, with one or more processors, effectuate operations comprising: obtaining a measured pressure from the plurality of pressure sensors every 1 second; obtaining a measured solar irradiance from the plurality of pressure sensors every 1 second; and storing the measured pressure and the measured solar irradiance over time in a memory.

16. A method of hydrostatic pressure testing comprising the steps of: providing a hydrostatic pressure testing system comprising: a controller configured to control the hydrostatic pressure testing system during hydrostatic pressure testing on an installation; a test fluid assembly configured to transfer a test fluid to the installation; a plurality of pumps configured to pressurize the installation to a first pressure level using the test fluid; a plurality of pressure sensors configured to measure pressure of the test fluid in the installation; and a plurality of irradiance sensors configured to measure solar irradiance on the installation, wherein: the controller is configured to, with one or more processors, effectuate operations comprising: monitoring the pressure of the test fluid as a function of time; and determining variations of the pressure over time, after the installation is pressurized to a first pressure level, caused by the solar irradiance.

17. The method of claim 16, wherein the variations of the pressure over time caused by the solar irradiance is determined in real time.

18. The method of claim 16, wherein the hydrostatic pressure testing system further comprising: a plurality of temperature sensors configured to measure temperature of the test fluid.

19. The method of claim 16, wherein the controller is configured to, with one or more processors, effectuate operations comprising: obtaining a regression model, wherein the regression model comprises one or more undetermined coefficients; determining the one or more undetermined coefficients using the measured pressure and the measured solar irradiance over time; and predicting the pressure of the test fluid in the installation using the regression model.

20. The method of claim 16, wherein the controller is configured to, with one or more processors, effectuate operations comprising: obtaining a sinusoidal model, wherein the sinusoidal model comprises one or more undetermined coefficients; and determining the one or more undetermined coefficients using the measured pressure and the measured solar irradiance over time.

What is claimed is:

1. A hydrostatic pressure testing system, comprising:
a controller configured to control hydrostatic pressure testing on a pressurizable system;
a test fluid assembly configured to transfer a test fluid to the pressurizable system;
a plurality of pumps configured to pressurize the pressurizable system using the test fluid;
a plurality of pressure sensors configured to measure pressure of the test fluid in the pressurizable system; and
a plurality of irradiance sensors configured to measure solar irradiance on at least a portion of the pressurizable system, wherein: the controller is configured to, with one or more processors, effectuate operations comprising:
obtaining, from the plurality of pressure sensors, measured pressures of the test fluid over time;
obtaining, from the plurality of irradiance sensors, measured solar irradiance over time; and
determining, based on the measured pressures of the test fluid and the measured solar irradiance over time, a portion of the measured pressure of the test fluid in the pressurizable system which is attributable to the measured solar irradiance;
wherein at least a first pressure of the test fluid at a first time in the pressurized system after the pressurized system is pressurized to a first pressure level is predicted based on the measured solar irradiance, and the plurality of pressure sensors measures the pressure of the test fluid at the first time and wherein the hydrostatic pressure testing system determines whether a difference between the predicted first pressure of the test fluid and the measured pressure of the test fluid at the first time is attributable to the measured solar irradiance.

2. The hydrostatic pressure testing system of claim 1, wherein the portion of the measured pressure attributable to the measured solar irradiance is determined in real time.

3. The hydrostatic pressure testing system of claim 1 further comprising:
a plurality of temperature sensors configured to measure temperature of the test fluid in at least a portion of the pressurized system,
the controller further configured to effectuate operations comprising:
obtaining, from the plurality of temperature sensors, measured temperatures of the test fluid over time; and
determining, based on the measured temperatures of the test fluid over time, an additional portion of the measured pressure of the test fluid in the pressurizable system which is attributable to the measured temperatures of the test fluid.

4. The hydrostatic pressure testing system of claim 1, the operations further comprising:
obtaining a regression model, wherein the regression model relates pressure to at least one of solar irradiance and time and wherein the regression model comprises one or more undetermined coefficients;
determining, by fitting of the regression model to at least one of the measured pressure of the test fluid and the measured solar irradiance, the one or more undetermined coefficients of the regression model; and
predicting, with the regression model with the one or more determined coefficients obtained by fitting, an additional pressure of the test fluid in the pressurized system.

5. The hydrostatic pressure testing system of claim 1, wherein the test fluid is a non-compressible fluid.

6. The hydrostatic pressure testing system of claim 1, wherein at least some areas of the pressurized system are exposed to solar irradiance.

7. The hydrostatic pressure testing system of claim 6, wherein at least some of the plurality of irradiance sensors are located on the at least some areas of the pressurized system that are exposed to solar irradiance.

8. The hydrostatic pressure testing system of claim 1, wherein at least some of the plurality of irradiance sensors are variants of an actinometer.

9. The hydrostatic pressure testing system of claim 1, wherein at least some of the plurality of irradiance sensors are pyranometers or pyrheliometers.

10. The hydrostatic pressure testing system of claim 1, wherein:
the first pressure level is in a range of 5,000 psi and 15,000 psi.

11. The hydrostatic pressure testing system of claim 1, the operations further comprising:
obtaining a sinusoidal model, wherein the sinusoidal model relates solar irradiance to at least one of time and pressure and wherein the sinusoidal model comprises one or more undetermined coefficients;
determining, by fitting of the sinusoidal model to at least one of the measured solar irradiance, the measured pressure, and time, the one or more undetermined coefficients of the sinusoidal model; and
determining, with the sinusoidal model with the one or more determined coefficients, a relationship for the portion of the measured pressure of the test fluid in the pressurizable system which is attributable to the measured solar irradiance.

12. The hydrostatic pressure testing system of claim 1, the operations further comprising:
obtaining, from at least some of the plurality of pressure sensors, a measured pressure every 1 second;
obtaining, from at least some of the plurality of irradiance sensors, a measured solar irradiance 1 second; and
storing, by the processor, the measured pressure and the measured solar irradiance obtained over time in a memory,
wherein the portion of the measured pressure of the test fluid in the pressurizable system which is attributable to the measured solar irradiance is determined based on at least some of the stored measured pressure and stored measured solar irradiance.

13. A method of hydrostatic pressure testing comprising steps of: providing, by a hydrostatic pressure testing system comprising a controller, a hydrostatic pressure test on a pressurizable system, the hydrostatic pressure test comprising:
transferring, by a test fluid assembly, a test fluid to the pressurizable system;
pressurizing, by a plurality of pumps, the pressurizable system using the test fluid;
measuring, with a plurality of pressure sensors, the pressure of the test fluid in the pressurizable system; and
measuring, with a plurality of irradiance sensors, solar irradiance on at least a portion of the pressurizable system; wherein, the controller further is configured to, with one or more processors, effectuate operations comprising:
obtaining, from the plurality of pressure sensors, the measured pressures of the test fluid over time;
obtaining, from the plurality of irradiance sensors, the measured solar irradiance over time; and
determining, based on the measured pressures of the test fluid over time and the measured solar irradiance over time, a portion of the measured pressure of the test fluid in the pressurizable system which is attributable to the measured solar irradiance, wherein at least a first pressure of the test fluid at a first time in the pressurized system is predicted after the pressurized system is pressurized to a first pressure level based on the measured solar irradiance, and the plurality of pressure sensors measures the pressure of the test fluid at the first time and wherein the hydrostatic pressure testing system determines whether a difference between the predicted first pressure of the test fluid and the measured pressure of the test fluid at the first time is attributable to the measured solar irradiance.

14. The method of claim 13 further comprising:
steps for determining, by the controller, based on at least one of the measured pressures of the test fluid over time and the measured solar irradiance over time, a relationship between solar irradiance and pressure for the test fluid in the pressurized system.

15. The method of claim 13 further comprising:
steps for developing, by the controller, based on at least one of the measured pressures of the test fluid over time and the measured solar irradiance over time, a solar irradiance estimation model using an estimated global horizontal irradiance on the pressurized system.

16. The method of claim 13, wherein the portion of the measured pressure attributable to the measured solar irradiance is determined in real time.

17. The method of claim 13, further comprising:
measuring, by a plurality of temperature sensors, temperatures of the test fluid in the pressurizable system,
the operations further comprising determining, based on the measured temperatures of the test fluid over time, an additional portion of the measured pressure of the test fluid in the pressurizable system which is attributable to the measured temperatures of the test fluid.

18. The method of claim 13, wherein the operations further comprising:
obtaining a regression model, wherein the regression model relates pressure to at least one of solar irradiance and time and wherein the regression model comprises one or more undetermined coefficients;
determining, by fitting of the regression model to at least one of the measured pressure of the test fluid and the measured solar irradiance, the one or more undetermined coefficients of the regression model; and
predicting, with the regression model with the one or more determined coefficients obtained by fitting, an additional pressure of the test fluid in the pressurized system.

19. The method of claim 13, wherein the operations further comprising:
obtaining a sinusoidal model, wherein the sinusoidal model relates solar irradiance to at least one of time and pressure and wherein the sinusoidal model comprises one or more undetermined coefficients; and
determining, by fitting of the sinusoidal model to at least one of the measured solar irradiance, the measured pressure, and time, the one or more undetermined coefficients of the sinusoidal model; and
determining, with the sinusoidal model with the one or more determined coefficients, a relationship for the portion of the measured pressure of the test fluid in the pressurizable system which is attributable to the measured solar irradiance.

* * * * *